(12) United States Patent
Lima-Marques

(10) Patent No.: US 6,260,954 B1
(45) Date of Patent: *Jul. 17, 2001

(54) METHOD AND APPARATUS FOR THE PRODUCTION OF DISCRETE AGGLOMERATIONS OF PARTICULATE MATTER

(75) Inventor: Luis Lima-Marques, Blackwood (AU)

(73) Assignee: Tonejet Corporation Pty, Ltd., Eastwood (AU)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/244,943
(22) PCT Filed: Dec. 17, 1992
(86) PCT No.: PCT/AU92/00665
 § 371 Date: Aug. 8, 1994
 § 102(e) Date: Aug. 8, 1994
(87) PCT Pub. No.: WO93/11866
 PCT Pub. Date: Jun. 24, 1993

(30) Foreign Application Priority Data

Dec. 18, 1991 (AU) .................................................. PL0069

(51) Int. Cl.⁷ ....................................................... B41J 2/06
(52) U.S. Cl. .............................................................. 347/55
(58) Field of Search ................................ 347/55, 95, 151, 347/141, 147, 112, 34, 47, 30; 118/621, 625, 626, 627, 653; 204/164, 100, 180.2, 299 R

(56) References Cited

U.S. PATENT DOCUMENTS 2,556,550 * 6/1951 Murray ................................ 347/51 X
2,572,549 * 10/1951 White et al. ........................ 347/55 X
3,060,429  10/1962 Winston ................................. 347/554
3,129,157   4/1964 Loeckenhoff ......................... 204/553
3,575,841   4/1971 Harris ................................... 204/643
3,980,541   9/1976 Aine ..................................... 204/554
4,014,029 *  3/1977 Lane et al. ............................. 347/47
4,287,522 *  9/1981 Meyer .................................... 347/95
4,330,788 *  5/1982 Hinz et al. ......................... 347/151 X
4,367,479 *  1/1983 Bower .................................... 347/30
4,383,265 *  5/1983 Kohashi ................................. 347/55
4,396,925 *  8/1983 Kohashi ................................. 347/55
4,402,000    8/1983 Fabel et al. ............................ 347/55
4,454,016    6/1984 Rabinowitz et al. ................. 204/666
4,502,054 *  2/1985 Brescia et al. ......................... 347/55
4,717,926    1/1988 Hotomi ................................... 347/55
5,144,340 *  9/1992 Hotomi et al. ......................... 347/55

FOREIGN PATENT DOCUMENTS 0198661  10/1986 (EP) .
62-5282   6/1985 (JP) .

OTHER PUBLICATIONS

Patent Abstracts of Japan, M–1021, p. 84, Jun. 20, 1990.

* cited by examiner

Primary Examiner—Benjamin R. Fuller
Assistant Examiner—C. Dickens
(74) Attorney, Agent, or Firm—Dykema Gossett PLLC

(57) ABSTRACT

A method and apparatus is provided for the generation of agglomerations of particulate material in a liquid. Agglomerations are built up at a point under the effect of an electric field and ejected by electrostatic means. The size of the agglomeration is dependent upon the strength of the electric field, point geometry, the nature of the liquid and the nature of the particles. Agglomerations of particles in the range of from 1 to 500 microns are produced The invention is useful for non-impact printing and other applications where delivery of agglomerations of particles is useful such as in inhalable pharmaceuticals.

37 Claims, 3 Drawing Sheets

METHOD AND APPARATUS FOR THE PRODUCTION OF DISCRETE AGGLOMERATIONS OF PARTICULATE MATTER

BACKGROUND OF THE INVENTION

This invention relates to a method and apparatus for the transfer of agglomerations of solid particulate matter suspended in a liquid to a recording surface.

One particular application to which this invention may be applied is the transfer of agglomerations of high intensity colouring materials to a recording surface for the purpose of non-impact printing. It is to be understood, however, that the invention is not limited to delivering coloured materials for the purpose of non-impact printing but may be used to deposit other materials in a defined pattern on a substrate. Examples of other applications include the delivery of biological materials for use in immunoassay, delivery of particulate drugs and deposition of phosphors or flurophosphors for security coding.

This invention, however, will be discussed in relation to its application to printing but its scope is broader than this.

There are a number of different forms of equipment used for the non-impact printing systems which are generally referred to as ink jet printing. It is usual for ink to be fed through a nozzle, the exit diameter of which nozzle being a major factor in determining the droplet size and hence the size of the resulting dots on a recording surface. The droplets may be produced from the nozzle either continuously in which case the method is termed continuous printing or they may be produced individually as required in which case the method is termed drop on demand printing. In continuous printing an ink is delivered through the nozzle at high pressure and the nozzle is perturbed at a substantially constant frequency which results in a stream of droplets of constant size. By applying charge to the droplets and using an electric field external to the nozzle selected droplets may be deflected in their passage to the recording surface in response to a signal effecting the electric field whereby forming a pattern on the recording surface in response to the control signal. Drop on demand printing operates by producing local pressure pulses in the liquid in the vicinity of a small nozzle which results in a droplet of liquid being ejected from the nozzle.

In either type of jet printing the colouring material is a soluble dye combined with binders to render the printed image more permanent. The disadvantage of soluble dyes is that the printed image density is not high enough in many applications and that the dyes fade under exposure in the environment. A further disadvantage with soluble dye materials is that the quality of the printed image is dependent on the properties of the recording surface. Pigmented inks are known to produce higher density images than soluble dyes and are also more permanent. Pigments may also be used in jet printers but the production of a dense image requires a high concentration of pigment material in a liquid carrier. The high concentration of pigment material affects the droplet breakup in continuous printers and results in less uniform printing. Drop on demand printers do not have a high continuous pressure and the droplet generation is strongly dependent on local conditions in the nozzle, therefore the presence of pigments can block the nozzle or otherwise modify the local nozzle conditions or block the nozzle such that droplets are not correctly ejected.

A further process, known as electrostatic ink jet printing, is characterised by an electrostatic pull on a liquid and is disclosed in for instance U.S. Pat. No. 3,060,429. This involves the generation and acceleration of charged droplets, from a nozzle containing the liquid, to a platen electrode by a high voltage being maintained between the nozzle and the platen. This process is further optimised by including a valving electrode that is used to interrupt or control the jet flow as well as two pairs of electrodes used to manipulate the flight path of the droplets. Ink jet printing is achieved by locating a paper substrate just prior to the platen electrode and using a conductive solution of ink.

It is an object of this invention to provide agglomerations of particulate material in a liquid which are not produced by a nozzle and hence the size of the agglomerations are not affected by the size of the nozzle.

It is a further object of this invention to provide agglomerations of particles in a liquid with a very high concentration of particulate material so that a high concentration of the particulate material can be provided onto a recording surface.

It is a further object of this invention to produce agglomerations of particles in a liquid using a liquid which is not necessarily conductive.

DESCRIPTION OF THE INVENTION

In one form the invention is said to reside in a method of generation of discrete agglomerations, clumps, aggregates, accumulations, clusters or the like of a particulate material in a liquid from a liquid having the particulate material therein, the method comprising the steps of providing the liquid including the particulate material to an ejection location, applying an electrical potential to the ejection location to form an electric field at the location and causing agglomerations to form on the ejection location and ejecting such agglomerations away from the ejection location by electrostatic means.

In a further form the invention is said to reside in a method of generation of discrete agglomerations, clumps, aggregates, accumulations, clusters or the like of a particulate material in a liquid from a liquid having a lesser concentration of a particulate material therein, the method comprising the steps of providing the liquid including the particulate material in the lesser concentration to an ejection location, applying an electrical potential to the ejection location to form an electric field at the location and causing agglomerations of particles within the liquid to form on the ejection location with a higher concentration of the particulate material within the liquid and ejecting such agglomerations away from the ejection location by electrostatic means.

It will be seen that by this invention the size of the agglomerations are not dependent upon the size of any nozzle which delivers liquid carrying the particulate material to the ejection location but is dependent upon the ejection location geometry, the level of the electrical field and the nature of the liquid and particulate material.

It can also be seen that the present invention differs from the prior art in that the liquid is not necessarily a conductive liquid. Agglomerations of particles in the liquid appear to be formed by electrostatic means acting upon the particles. The liquid acts solely as a carrier. The transfer of particles instead of liquid solutions of colouring matter means that a more intense image can be formed on a substrate and a finer dot size can be formed with a quicker drying dot.

In one preferred form of the invention the electrical potential forming the field may be pulsed so that there is periodic formation and ejection of agglomerations of particles in the liquid from the ejection location.

There may, therefore, be provided a flow of liquid including a particulate material to the ejection location and the withdrawal of excess liquid from the ejection location. Such withdrawal of excess liquid may be by means of a vacuum extraction. It will be realised that a certain amount of particulate material may be withdrawn along with the excess liquid from the ejection location.

The electrical potential will cause a electric field to build at the ejection location particularly dependent upon the geometry such as the radius of curvature of the ejection location and in a preferred embodiment of the invention the ejection location may be provided by a needle having a radius of curvature at its tip in the range of 5–50 microns. Alternatively the ejection location may be provided by an elongate sharpened edge. There may be a number of ejection locations along the elongate edge or there may be a matrix of ejection locations.

The method of this invention may produce agglomerations of particles in the liquid with a high concentration of particulate material therein in a size range of 1 microns to 500 microns in diameter.

Preferably the liquid is a non-electrically conducting liquid and the particulate material is comprised of chargeable particles. Preferably the chargeable particles may be charged to the same polarity as the voltage applied to the ejection location.

The electrical potential applied to the ejection location may be in the range of 500 to 5000 volts.

In an alternative form the invention may be said to reside in an apparatus for generation of discrete agglomerations, clumps, aggregates, accumulations, clusters or the like of a particulate material in a liquid from a liquid having the particulate material in a lesser concentration comprising an ejection location, means to apply an electrical potential to the ejection location to form an electric field at the location and means to supply liquid with the particulate material of the lesser concentration to the ejection location.

It will be seen that by this form of the invention an apparatus is provided which will enable agglomerations of particles in a liquid and containing a high concentration of particulate material to be produced and ejected from the ejection location.

There may be further provided means to provide a flow of liquid to the ejection location. Such a flow may be provided by means of a pump or by gravity feed or some other means.

There may be further included vacuum extraction means to withdraw excess liquid and any carryover of particulate material from the ejection location.

In one form the ejection location may be provided by a needle point having a radius of curvature of from 5 to 50 microns or the ejection location may be provided by an elongate edge having a semi cylindrical surface having a radius of curvature of 5 to 50 microns. Alternatively the ejection location may comprise a matrix of ejection points.

The apparatus according to this invention may be adapted to provide agglomerations on demand or to provide a continuous stream of agglomerations which can be deflected by electrostatic means external to the apparatus. The supply of agglomerations of particulate material on demand may be provided by providing a pulsed electrical potential to the ejection location.

Generally it can be seen that this invention provides what may be termed an electrophoretic concentration of particulate material in a liquid at an ejection location and the electrostatic ejection of such agglomerations.

Although the mechanism for operation of the agglomeration formation is not fully understood one theory, to which the applicants are not necessarily bound, is as follows. Particles in the liquid flowing to the ejection location are inherently charged or charged to the same polarity as the ejection location and because of the electrical field concentration which would build up particularly at the tip of the ejection location more and more particles build up on the ejection location expanding an agglomeration of particles within the entrained liquid and with increasing repulsion the particles moving away from the ejection location until electrostatic repulsion between the ejection location and the agglomeration of the charged particles builds up to such an extent that surface tension of the entrained liquid can no longer hold the agglomeration to the ejection location. At this stage the agglomeration is repulsed by electrostatic means.

It may be particularly noted that because the repulsion is substantially electrostatic no earthed substrate is necessary to attract the agglomerations to a substrate and in fact considerable distances of agglomeration flight can occur before they impinge a substrate. This enables suitable electrostatic or other forms of deflection equipment to provide whatever patterning of agglomerations is required on a substrate.

It should be noted that the invention is not limited to the supply of coloured ink particles for the purposes of printing onto substrates. In the field of medical technology there are many instances where it is desirable to deliver insoluble particulate material without the use of gas operated atomisers. Many inhalant pharmaceuticals are delivered as particulates, examples include beclomethasone dipropionate which is the most common corticosteroid used in the treatment of asthma and sodium cromoglycate used as a prophylactic for asthma. These may be applicable to the present invention because an agglomeration of particles of the pharmaceutical can be delivered with a minimum of carrier liquid.

The invention therefore generally covers the delivery of particulate pharmaceuticals for instance into the respiratory tract suspended in a non-toxic insulative carrier. Such a system provides a fast route for the delivery of drugs to the blood stream.

This then generally describes the invention but to assist in understanding the invention reference will now be made to the accompanying drawings which show a preferred embodiment of the invention and illustrates a theoretical action of the invention.

DESCRIPTION OF THE PREFERRED EMBODIMENT

Figure 1:
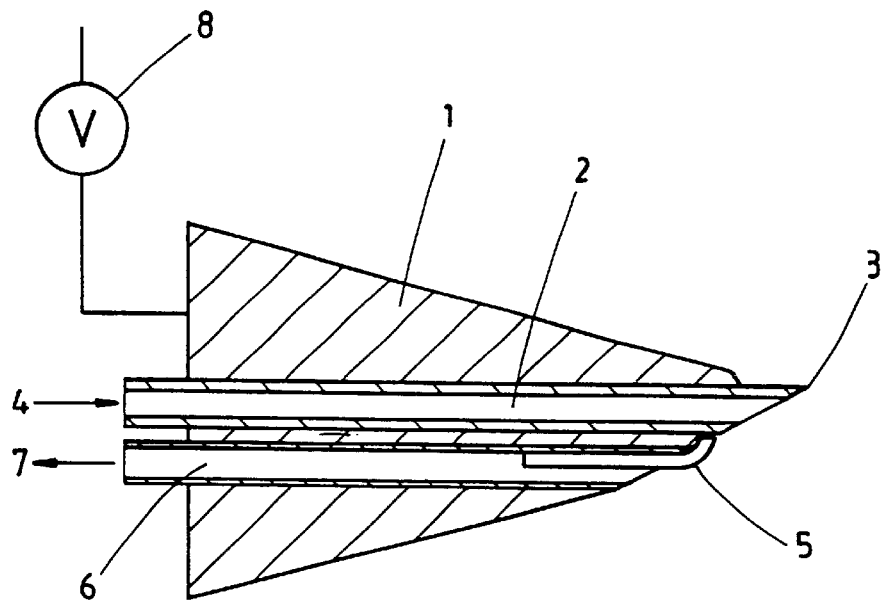
FIG. 1 shows a sectional view of an ejection location assembly of a first embodiment of the invention.

FIG. 1. is a sectional side view of a preferred embodiment showing the apparatus for generation of discrete agglomerations of particles in a liquid including the supply of a liquid containing particulate material, the ejection location, means to apply a high voltage and a means to withdraw excess liquid and particulate material.

FIG. 1 illustrates the principal aspect of the invention, in which the apparatus for generation of discrete agglomerations of particles within a liquid consists of an electrically conducting body 1 fashioned to a tapered point Within the body 1 and in electrical contact with it is an electrically conducting supply tube 2. The supply tube 2 is longer than the body 1 and protrudes from the body 1 at both ends. At the tapered end of the body 1, the supply tube 2 is finished at an angle of 30° to its length and therefore has a point with a small radius of curvature on the top surface, referred to as an ejection point 3. The other end of the supply tube 2 connects with a constant pressure supply system 4 for the particulate containing liquid. The constant pressure supply system can be a gravity feed to the supply tube 3 or it can be a pump drawing liquid containing the particulate material from a reservoir (not shown). Below the ejection point 3 on the underside of the body 1 is a flow director 5 in the form of a vane, which directs the excess liquid and particulate material to the removal channel 6. The removal channel 6 is connected to an external extraction system 7, which removes and reclaims the excess liquid and particulate material. The external extraction system can be a vacuum extraction system. A voltage 8 can be applied to the body 1 and therefore to the supply tube 2.

To operate the invention particulate containing liquid is supplied to the body 1 via the supply system 4 at a constant low pressure. The particulate containing liquid passes along the supply tube 2 towards the ejection point 3. When a voltage 8 is applied to the body 1 then, due to the shape of the body 1 and the supply tube 2, the electric field created is greatest at the ejection point. The particulate material in the liquid is inherently charged or charged to the same polarity as the applied voltage, is concentrated at the ejection point 3 and, if the field is sufficiently strong, then an agglomeration of particulate material together with a small amount of liquid is ejected in the direction normal to the ejection point. If the voltage is maintained then the ejection will be repeated with a frequency dependent on the magnitude of the applied voltage, geometry of the apparatus, properties of the liquid and properties of the particulate material. The residual liquid and any remaining particulate material are directed to the removal channel 6 by means of the flow director or vane 5 and withdrawn by the extraction system 7.

Figure 2:
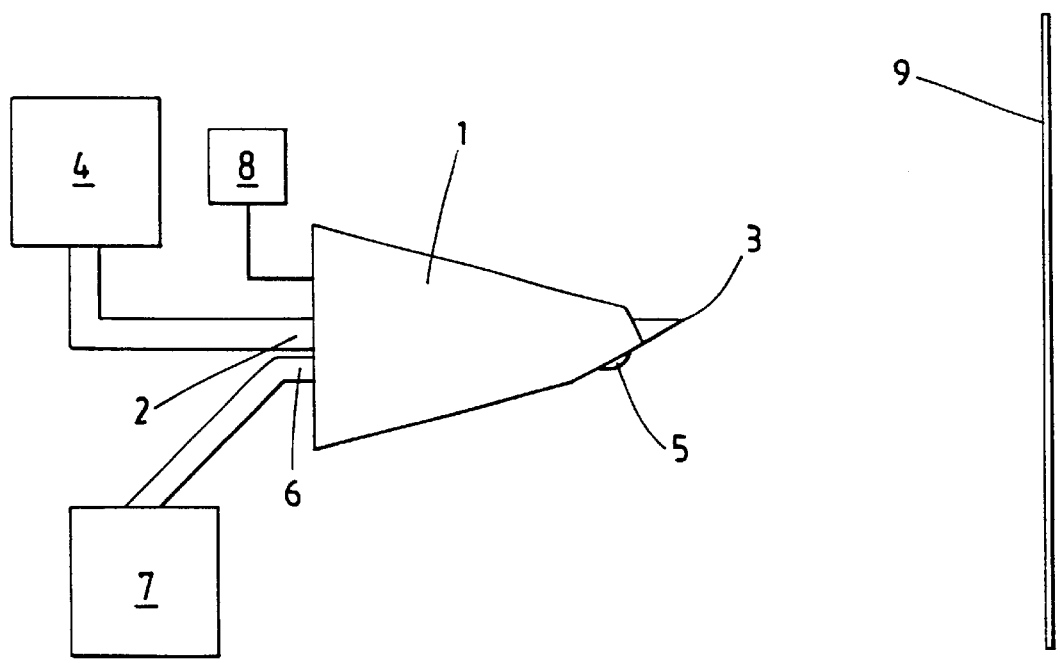
FIG. 2 shows the ejection location of FIG. 1 and a printing substrate to be imaged

FIG. 2 show the apparatus assembly of the embodiment of FIG. 1 and a substrate 9 and illustrates the relative position of the agglomeration generating apparatus and the substrate. Agglomerations of particles in a liquid generated at the ejection point are propelled by electrostatic means to the substrate and impinge thereon. The substrate may be between 1 mm and 200 mm away from the ejection point depending upon the magnitude of the applied voltage, geometry of the ejection point and the properties of the liquid and the particulate material.

Figure 3:
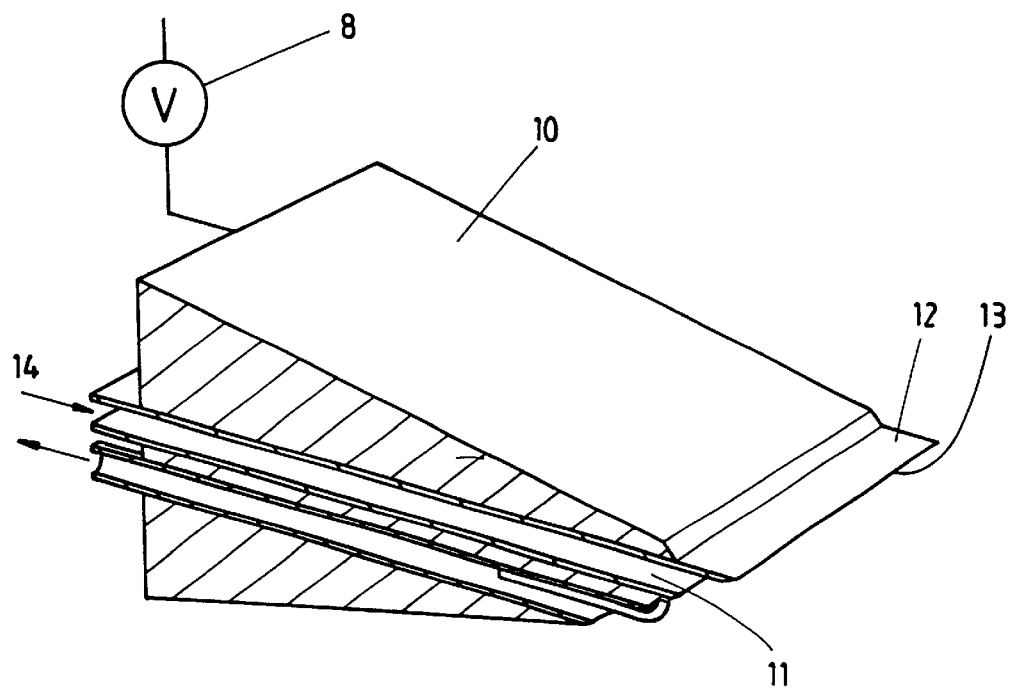
FIG. 3 shows an alternative embodiment of a drop generation apparatus according to the invention utilising an ejection edge rather than an ejection point

FIG. 3 shows an alternative embodiment of the invention employing an ejection edge 13. The ejection edge 13 is a blade 12 protruding from the tip of a wedge shaped body 10. The body 10 and the blade 12 are in electrical contact. When a voltage 8 is applied to the body 10 then, due to the shape of the body 10 and the blade 12, the electric field is greatest at the ejection edge 13. Particulate containing liquid, which is supplied to the body 10 via a supply system 14, passes along a supply channel 11 towards the ejection edge 13. If the field is sufficiently strong agglomeration of particulate material together with a small amount of liquid will be ejected from the ejection edge 13. The positions along the ejection edge 13 at which ejection occurs are dependent on the geometry of the edge. If the voltage is maintained then the ejection of agglomerations is repeated with a frequency dependent on the magnitude of the applied voltage, geometry of the apparatus, properties of the liquid and the properties of the particulate material. The repeated ejection occurs along the ejection edge 13. The residual liquid and any remaining particulate material are removed in the same manner as described in FIG. 1.

If a small point is made on the ejection edge 13 then the ejection will usually only occur at this point Likewise, if a second point is made then ejection will normally only occur at these two points.

Figure 4:
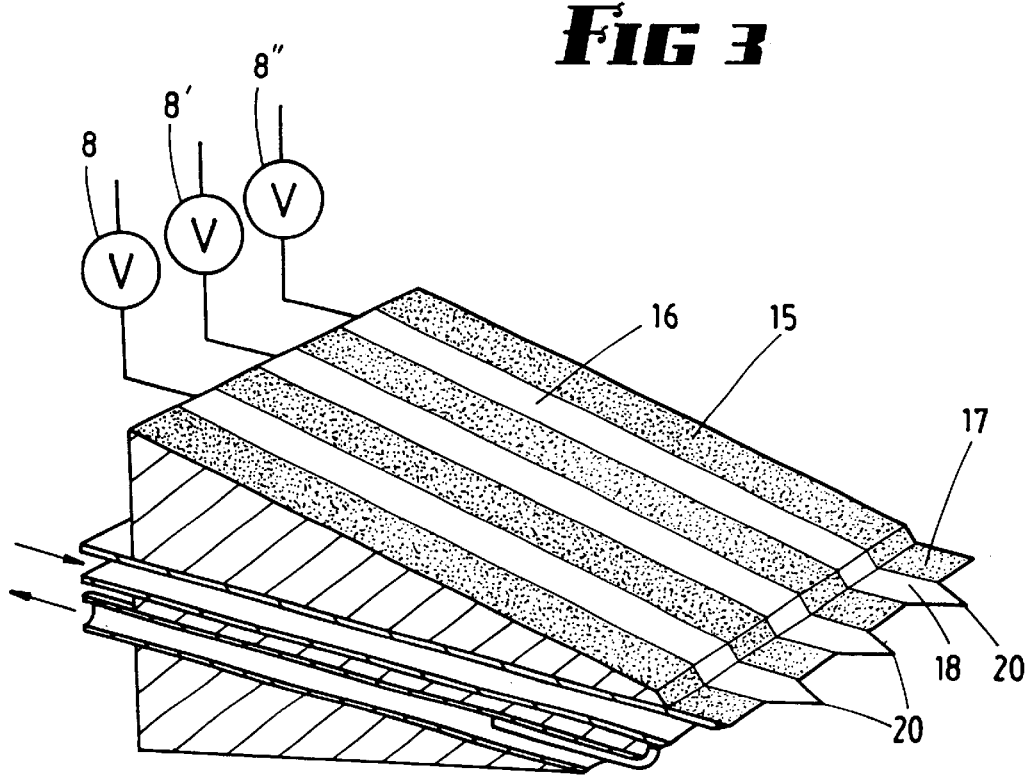
FIG. 4 shows an alternative embodiment of a drop generation apparatus according to the invention utilising multiple ejection points

FIG. 4 shows an extension of the design as described in FIG. 3 with a multiplexed system employed. The wedge shaped body 10 is made up of electrically conducting sections 16 separated by insulative material 15. Likewise, the blade 17 comprises electrically conducting sections 18 which are separated by insulative material 19. At the end of the blade 17 the conducting sections 18 protrude from the insulating material 15 and each is machined to an ejection point 20.

Supply of the particulate containing liquid to the ejection points 20 and removal of the residual liquid and any remaining particulate material are as described in FIG. 3 and FIG. 1 respectively. A voltage 8, 8' or 8" can be applied to any one conducting section 16 such that agglomeration of particulate material together with a small amount of liquid are ejected from the corresponding ejection point 20. By applying a voltage 8, 8' or 8" to other conducting sections 16 agglomerations of particulate material in a liquid can be made to eject from the corresponding ejection points 20. Subject to control electronics supplying the applied voltages 8, 8' or 8" it is possible to eject agglomerations of particulate material in a liquid from the ejection points 20 in any combination and for any desired time span.

FIGS. 5A to 5E show one possible explanation of the stages of formation of agglomerations at the ejection location where the agglomerations have a greater concentration of the particulate material than the liquid supplied to the ejection location. The applicants are not intending to be limited to this explanation.

Figure 5:
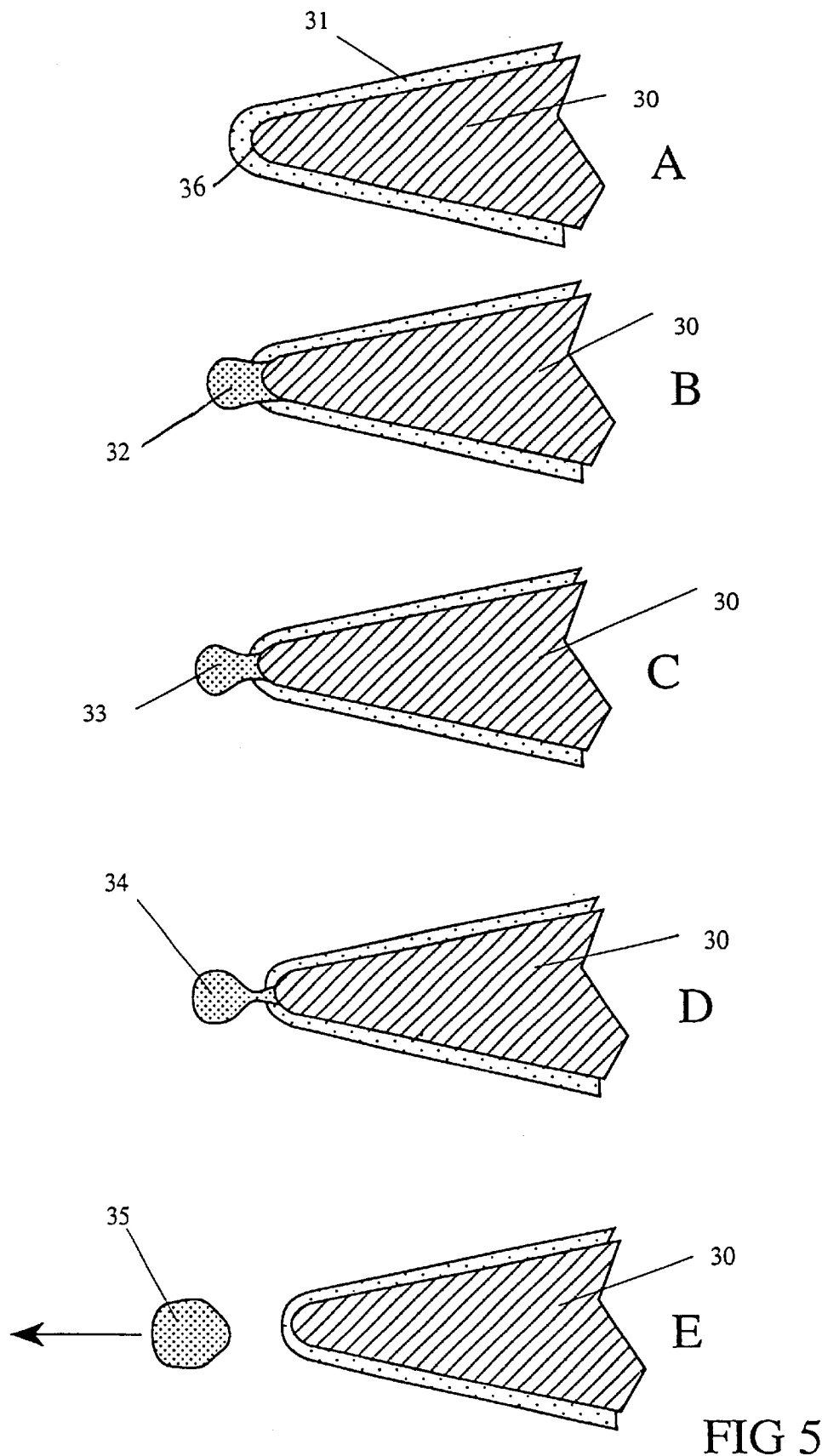
FIGS. 5A–5E show one interpretation of the method of operation of the invention

Liquid 31 containing a particulate material is supplied to the ejection location 30 by flowing liquid and the particulate material along a surface of the body leading up to the ejection location 36 as shown in FIG. 5A. As they reach the ejection location the particles are charged to the same polarity as the electrical potential at the ejection location and because of the high electrical field concentration that forms at the ejection location the particles are repulsed to commence the formation of an agglomeration 32 as can be seen in FIG. 5B.

As more and more particles are repulsed from the ejection location and join the forming agglomeration the size of the agglomeration 33, 34 forming at the ejection location is increased as shown in FIGS. 5C and 5D but is prevented from escaping due to surface tension in the liquid. When the agglomeration contains sufficient particles the electrostatic repulsion is sufficiently strong to overcome the surface tension of the liquid and the agglomeration 35 escapes as shown in FIG. 5E. Electrostatic repulsion between the ejection location and the escaping agglomeration causes the agglomeration to travel in a straight line dependant on the electrostatic field geometry about the ejection location.

EXAMPLES

Tests were carried out using three combination of voltage, liquid, particulate material and point geometry. In each the apparatus was as shown in FIG. 1 with a single ejection point Results are as shown in the table below.

TABLE

|  | 1 | 2 | 3 |
|---|---|---|---|
| VOLTAGE | 1000 Volts | 2500 Volts | 5000 Volts |
| PARTICULATE MATERIAL | ORGANIC PIGMENT | ORGANIC PIGMENT | CARBON BLACK |
| LIQUID | ISO-PARAFFIN I.B.P. 159° C. | ISO-PARAFFIN I.B.P. 159° C. | ISO-PARAFFIN I.B.P. 190° C. |
| RADIUS OF CURVATURE OF EJECTION POINT | 25 µm | 25 µm | 25 µm |
| RADIUS OF FORMED AGGLOMERATION | 4 µm | 10 µm | 10 µm |
| THROW DISTANCE | 90 mm | 5 mm | 50 mm |
| RADIUS OF PRINTED DOT | 8 µm | 25 µm | 30 µm |

I.B.P. is Initial Boiling Point

It can be seen that the radius of the agglomeration and hence the radius of the printed dot can be altered by changing the variables.

What is claimed is:

1. A method for agglomerating particulate matter in a liquid and ejecting discrete agglomerations of said particulate matter in a desired trajectory, comprising the steps of:
    providing an ejection location;
    supplying the liquid including the particulate matter to the ejection location;
    creating an electric field at the ejection location causing said ejection location to become electrically charged, said electric field having a direction generally in a direction of the desired trajectory, said particulate matter experiencing as a result of such electric field a force resulting in agglomeration of the particulate matter and;
    directly ejecting the agglomerations out of the liquid and away from the ejection location in the direction of the electric field by electrostatic repulsion between the agglomerations and the ejection location.

2. A method according to claim 1, further comprising the step of pulsing the electric field such that said agglomerations are periodically ejected out of the liquid and away from the ejection location.

3. A method according to claim 1, further comprising the step of withdrawing excess of said liquid from the ejection location.

4. A method according to claim 1, further comprising the step of vacuum extracting excess of said liquid from the ejection location.

5. A method according to claim 1, further comprising providing the ejection location with a needle point having a radius of curvature of 5 to 50 microns.

6. A method according to claim 1, further comprising providing the ejection location with an elongate edge.

7. A method according to claim 6, wherein the elongate edge includes a plurality of ejection points.

8. A method according to claim 1, wherein said agglomerations have a diameter of 1 micron to 500 microns.

9. A method according to claim 1, wherein the liquid is a non-electrically conducting liquid.

10. A method according to claim 1, wherein the particulate matter comprises chargeable particles.

11. A method according to claim 10, wherein the chargeable particles are charged to a polarity which is the same as a polarity of the ejection location.

12. A method according to claim 1, wherein a size of the agglomerations is dependent upon at least one of a nature of the liquid, the particulate matter and the electric field.

13. A method according to claim 1, wherein said discrete agglomerations comprise the particulate matter together with a proportion of the liquid.

14. A method according to claim 13, wherein the proportion of the liquid is dependent upon a nature of the liquid, the particulate matter and the electric field.

15. A method for agglomerating particulate matter in a liquid and ejecting discrete agglomerations of the particulate matter, comprising the steps of:
    providing an ejection location;
    supplying the liquid including the particulate matter to the ejection location;
    creating an electric field at the ejection location, said electric field causing said ejection location to become electrically charged, said electric field having a direction, said particulate matter experiencing as a result of such charge a force resulting in agglomeration of the particulate matter;
    said electric field acting on the particulate matter such that said discrete agglomerations are directly ejected out of the liquid and away from the ejection location by electrostatic repulsion operating in the direction of the electric field between the agglomerations and the ejection location.

16. A method according to claim 15, further comprising the step of pulsing the electric field such that said agglomerations are periodically ejected out of the liquid and away from the ejection location.

17. A method according to claim 15, further comprising the step of withdrawing excess of said liquid from the ejection location.

18. A method according to claim 15, further comprising the step of vacuum extracting excess of said liquid from the ejection location.

19. A method according to claim 15, wherein the ejection location is provided by a needle point having a radius of curvature of 5 to 50 microns.

20. A method according to claim 15, further comprising providing the ejection location with an elongate edge.

21. A method according to claim 20, wherein the elongate edge includes a plurality of ejection points.

22. A method according to claim 15, wherein said agglomerations have a diameter of 1 micron to 500 microns.

23. A method according to claim 15, wherein the liquid is a non-electrically conducting liquid.

24. A method according to claim 15, wherein the particulate matter comprises chargeable particles.

25. A method according to claim 24, wherein the chargeable particles are charged to a polarity which is the same as a polarity of the ejection location.

26. A method according to claim 25, wherein a size of the agglomerations is dependent upon at least one of a nature of the liquid, the particulate matter and the electric field.

27. A method according to claim 15, wherein said discrete agglomerations comprise the particulate matter together with a proportion of the liquid.

28. A method according to claim 27, wherein the proportion of the liquid is dependent upon at least one of a nature of the liquid, the particulate matter and the electric field.

29. An apparatus comprising:

a body having an ejection location;

a liquid supply for supplying a liquid containing a particulate matter to the ejection location; and an electrical supply connected to the body that creates an electric field at the ejection location, said electric field having a direction, said particulate matter experiencing as a result of said electric field a force resulting in agglomeration of the particulate matter to form discrete agglomerations thereof and to eject said discrete agglomerations directly from the liquid supplied at the ejection location in the direction of the electric field.

30. An apparatus according to claim 29, further comprising a vacuum extraction means for withdrawing excess of said liquid from the ejection location.

31. An apparatus according to claim 29, wherein the ejection location is a needle point.

32. An apparatus according to claim 29, wherein the ejection location is an elongate edge.

33. An apparatus according to claim 29, wherein the ejection location comprises a plurality of points along an elongate edge.

34. An apparatus according to claim 29, wherein the ejection location comprises a matrix of ejection points.

35. An apparatus according to claim 29, wherein the ejection location comprises a hemispherical or semi-cylindrical surface having a radius of curvature of 5 to 50 microns.

36. An apparatus according to claim 29, wherein said electrical supply is pulsed to provide periodic ejection of the agglomerations.

37. An apparatus according to claim 29, wherein the electrical supply supplies a voltage of 500 to 5000 volts.

* * * * *